(12) United States Patent
Son et al.

(10) Patent No.: US 9,706,562 B2
(45) Date of Patent: Jul. 11, 2017

(54) STATION AND METHOD OF SETTING CONNECTION THE ACCESS POINT AND THE STATION

(71) Applicant: INTELLECTUAL DISCOVERY CO., LTD., Seoul (KR)

(72) Inventors: Ju Hyung Son, Uiwang-si (KR); Jin Sam Kwak, Uiwang-si (KR); Hyun Oh Oh, Gwacheon-si (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 92 days.

(21) Appl. No.: 14/536,892

(22) Filed: Nov. 10, 2014

(65) Prior Publication Data

US 2015/0131608 A1    May 14, 2015

(30) Foreign Application Priority Data

Nov. 11, 2013 (KR) .......................... 10-2013-0136089
Mar. 31, 2014 (KR) .......................... 10-2014-0038289

(51) Int. Cl.
| | | |
|---|---|---|
| H04W 4/00 | (2009.01) | |
| H04W 72/10 | (2009.01) | |
| H04W 76/02 | (2009.01) | |
| H04W 84/12 | (2009.01) | |

(52) U.S. Cl.
CPC ........... *H04W 72/10* (2013.01); *H04W 76/02* (2013.01); *H04W 84/12* (2013.01)

(58) Field of Classification Search
USPC ................ 370/252–312, 329–336, 401–463; 455/456–525
See application file for complete search history.

(56) References Cited

U.S. PATENT DOCUMENTS

| | | | | |
|---|---|---|---|---|
| 7,535,880 | B1* | 5/2009 | Hinman | H04W 12/08 370/338 |
| 7,613,160 | B2* | 11/2009 | Kitchin | H04W 16/14 370/345 |
| 9,173,224 | B2* | 10/2015 | Cai | H04W 72/10 |
| 9,312,931 | B2* | 4/2016 | Sato | H04L 5/0023 |
| 2010/0177756 | A1* | 7/2010 | Choi | H04W 72/042 370/338 |
| 2013/0089054 | A1* | 4/2013 | Hansen | H04L 1/0001 370/329 |
| 2014/0133478 | A1* | 5/2014 | Malladi | H04B 1/713 370/350 |
| 2014/0254502 | A1* | 9/2014 | Cai | H04W 48/20 370/329 |

* cited by examiner

*Primary Examiner* — Man Phan

(57) ABSTRACT

A method for setting connection between an access point and a station is provided. The method includes transmitting, by the access point, a communication setup message to one or more stations; and implementing, by the access point, connection setup according to a connection request by the station having received the communication setup message, wherein the communication setup message comprises information about a connection priority requirement by a plurality of network interface card modules, which are included in the access point, using different frequency bands.

8 Claims, 16 Drawing Sheets

STATION AND METHOD OF SETTING CONNECTION THE ACCESS POINT AND THE STATION

CROSS-REFERENCE TO RELATED APPLICATION

This application claims the benefit of Korean Patent Application No. 10-2013-0136089 filed on Nov. 11, 2013, and Korean Patent Application No. 10-2014-0038289 filed on Mar. 31, 2014, the entire disclosures of which are incorporated herein by reference.

TECHNICAL FIELD

The embodiments described herein pertain generally to a method for setting connection between an access point and a station.

BACKGROUND

In recent, as supply of mobile devices is widely spread, wireless LAN technology capable of providing mobile device users with wireless Internet services are being greatly spotlighted. The wireless LAN technology enables mobile devices, such as smart phones, smart pads, laptops, mobile multimedia players, and embedded devices, to be wirelessly connected to the Internet in a close distance.

Since initial wireless LAN technology supported a speed of 1~2 Mbps by frequency hopping, spread spectrum, infrared ray communication and others using a frequency of 2.4 GHz through the Institute of Electrical and Electronics Engineers (IEEE) 802.11, the wireless LAN technology could have recently supported a speed of maximum 54 Mbps by applying orthogonal frequency division multiplex (OFDM). Besides, IEEE 802.11 is commercializing or developing standards for various technologies such as improvement of quality for service (QoS), access point (AP) protocol compatability, security enhancement, radio resource measurement, wireless access for a vehicular environment, fast roaming, mesh network, interworking with an external network, and wireless network management.

Of IEEE 802.11, IEEE 802.11b supports a communication speed of maximum 11 Mbps by using a frequency of a 2.4 GHz band. IEEE 802.11a, which has been commercially used after IEEE 802.11b, reduced influence of interference, compared to the frequency of the significantly complicated 2.4 GHz band, by using a frequency of a 5 GHz band, instead of the 2.4 GHz band, and improved the communication speed up to maximum 54 Mbps by using the OFDM technology. However, IEEE 802.11a has a drawback in that its communication distance is shorter than IEEE 802.11b. In addition, like IEEE 802.11b, IEEE 802.11g has been significantly spotlighted since it realizes the communication speed of maximum 54 Mbps by using the frequency of the 2.4 GHz band and meets backward compatibility. In terms of the communication distance, IEEE 802.11g is also superior to IEEE 802.11a.

In addition, IEEE 802.11n was established as a technology specification to overcome the limit of the communication speed that has been blamed as a weakness of the wireless LAN. The purpose of IEEE 802.11n is to increase a speed and reliability of a network and expand an operation distance of a radio network. More specifically, IEEE 802.11n supports a high throughput (HT) with a data processing speed of maximum 540 Mbps or more, and is based on the multiple inputs and multiple outputs (MIMO) technology using multiple antennas in both ends of each of transmission and reception units in order to minimize transmission errors and optimize a data speed. In addition, this specification may use a coding method that transmits several overlapping copies in order to improve data reliability, and furthermore, orthogonal frequency division multiplex (OFDM) in order to increase a speed.

As supply of the wireless LAN increases, and applications using the wireless LAN are diversified, there has been recently increasing necessity for a new wireless LAN system to support a higher throughput (very high throughput; VHT) than the data processing speed supported by IEEE 802.11n. Especially, IEEE 802.11ac supports a broad bandwidth (80 MHz to 160 MHz) in the 5 GHz frequency. The IEEE 802.11ac standard is defined only for the 5 GHz band, but initial 11ac chipsets would also support the operation in the 2.4 GHz band for lower compatibility with existing 2.4 GHz-band products. In this case, 802.11ac supports a bandwidth of from 2.4 GHz to maximum 40 MHz. Theoretically, according to this standard, a wireless LAN speed of multiple devices can be at least 1 Gbps, and a maximum single link speed can be at least 500 Mbps. This is realized by expanding radio interface concepts accepted in 802.11n such as broader radio frequency bandwidth (maximum 160 MHz), more MIMO spatial streams (maximum 8 streams), multiple user MIMO, and high-density modification (maximum 256 QAM). In addition, there is IEEE 802.11ad, which transmits data by using a 60 GHz band, instead of existing 2.5 GHz/5 GHz. IEEE 802.11ad is a transmission specification for providing a speed of maximum 7 Gbps by using a beam-forming technology, and suitable for high bit-rate video streaming such as a large amount of data or uncompressed HD videos. However, the 60 GHz frequency band is disadvantageous in that it cannot easily pass through obstacles, and thus, should be used only among devices in a short distance space.

Meanwhile, Korean Patent No. 0643766 (Title of Invention: High-Speed Handover Method Optimized for IEEE 802.11 Network) describes classifying APs based on signal strength of peripheral APs, and determining an AP to implement handover on this basis.

SUMMARY

In view of the foregoing, example embodiments provide a connection setting method, which is capable of setting connection timing between access points and stations to be distributed.

In a first aspect of example embodiments, a method for setting connection between an access point and a station is provided. The method includes transmitting, by the access point, a communication setup message to one or more stations; and implementing, by the access point, connection setup according to a connection request by the station having received the communication setup message, wherein the communication setup message comprises information about a connection priority requirement by a plurality of network interface card modules, which are included in the access point, using different frequency bands.

In a second aspect of example embodiments, a method for setting connection between an access point and a station is provided. The method includes receiving, by the station, a communication setup message transmitted by the access point; reading information of a priority requirement for a station included in the communication setup message; and transmitting a connection request to each network interface card modules of the access point according to the information about the priority requirement for the station, wherein the communication setup message comprises information about a connection priority requirement by a plurality of network interface card modules, which is included in the access point, using different frequency bands.

In a third aspect of example embodiments, a method for setting connection between an access point and a station is provided. The method includes (a) transmitting, by a station management entity, to a MAC layer management entity included in the station, information about a communication setup message transmitted by the access point and information about a reporting timing of the communication setup message by the MAC layer management entity to the station management entity when the MAC layer management entity receives the communication setup message, and (b) adjusting, by the MAC layer management entity, a transmission timing of the communication setup message to the station management entity according to information about a connection priority requirement included in the communication setup message by the MAC layer management entity from the access point, and the information about the reporting timing, wherein the communication setup message comprises information about a connection priority requirement by a plurality of network interface card modules, which is included in the access point, using different frequency bands.

In accordance with the example embodiments, it is possible to reduce time required for link setup when radio communication is conducted. Especially, in accordance with the example embodiments, it is possible to provide an efficient radio link setup method, by which stations having received link setup congestion information distribute and implement link setup requests.

The example embodiments can be used for various communication devices such as stations using wireless LAN and stations using cellular communication.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
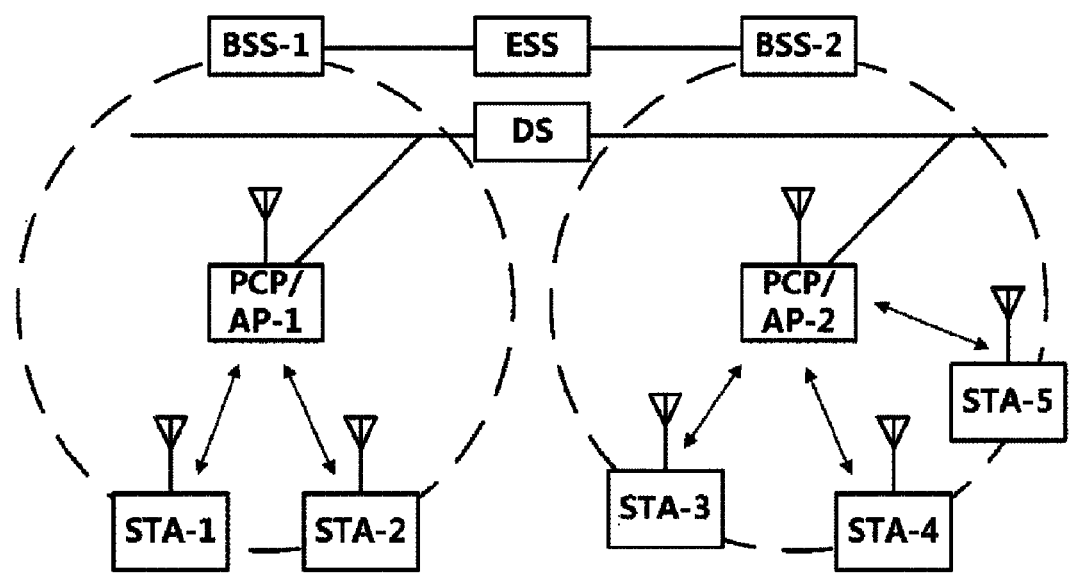
FIG. 1 illustrates a wireless LAN system in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

In a first aspect of example embodiments, a method for setting connection between an access point and a station is provided. The method includes transmitting, by the access point, a communication setup message to one or more stations; and implementing, by the access point, connection setup according to a connection request by the station having received the communication setup message, wherein the communication setup message comprises information about a connection priority requirement by a plurality of network interface card modules, which are included in the access point, using different frequency bands.

In a second aspect of example embodiments, a method for setting connection between an access point and a station is provided. The method includes receiving, by the station, a communication setup message transmitted by the access point; reading information of a priority requirement for a station included in the communication setup message; and transmitting a connection request to each network interface card modules of the access point according to the information about the priority requirement for the station, wherein the communication setup message comprises information about a connection priority requirement by a plurality of network interface card modules, which is included in the access point, using different frequency bands.

In a third aspect of example embodiments, a method for setting connection between an access point and a station is provided. The method includes (a) transmitting, by a station management entity, to a MAC layer management entity included in the station, information about a communication setup message transmitted by the access point and information about a reporting timing of the communication setup message by the MAC layer management entity to the station management entity when the MAC layer management entity receives the communication setup message, and (b) adjusting, by the MAC layer management entity, a transmission timing of the communication setup message to the station management entity according to information about a connection priority requirement included in the communication setup message by the MAC layer management entity from the access point, and the information about the reporting timing, wherein the communication setup message comprises information about a connection priority requirement by a plurality of network interface card modules, which is included in the access point, using different frequency bands.

Hereinafter, in accordance with an example embodiment will be described.

FIG. 1 illustrates a wireless LAN system in accordance with an example embodiment.

The wireless LAN system includes one or more basic service sets (BSSs), which indicate a group of devices that can be successfully synchronized to communicate with one another. In general, BSS may be divided into infrastructure BSS and independent BSS (IBSS), and FIG. 1 shows infrastructure BSS.

As illustrated in FIG. 1, the infrastructure BSSs (BSS1, BSS2) include one or more stations (STA-1, STA-2, STA-3, STA-4 and STA-5), access points (PCP/AP-1, PCP/AP-2), which are stations providing a distribution service, and a distribution system (DS) for connecting a multiple number of access points (PCP/AP-1, PCP/AP-2) to one another.

The station (STA) is a certain device including a medium access control (MAC) following the regulations of the IEEE 802.11 standard and physical layer interface for a radio medium, and includes any access points (APs) and non-access point STAs (Non-AP stations) in a broad sense. The station for wireless communication includes a processor and a transceiver, and may further include a user interface unit, a display unit and others in accordance with an example embodiment. The processor produces a frame to be transmitted through a wireless network or processes a frame received through the wireless network, and implements other various processes for control of a station. The transceiver is functionally connected to the processor, and transmits and receives a frame for a station through a wireless network.

The access point (AP) is an entity providing connection to the distribution system (DS) via a radio medium for a station connected to the access point. Although it is the principle that in the infrastructure BSS, communication between STAs not being connected to an AP is conducted via an AP, direct communication between STAs not being connected to an AP is possible if direct link has been set. Meanwhile, in example embodiments, the AP has a concept to include a personal BSS coordination point (PCP), and may have a concept to include any intensive controller, base station (BS), node-B, base transceiver system (BTS), site controller or others in terms of a broad sense.

A multiple number of infrastructure BSSs may be connected to one another through the distribution system (DS). In this case, the multiple number of the BBSs connected to one another through the DS are referred-to as an "extended service set (ESS)." STAs included in the ESS can communicate with one another, and STAs not being connected to an AP within an identical ESS may move from one BSS into another BSS while seamlessly communicating with one another.

Figure 2:
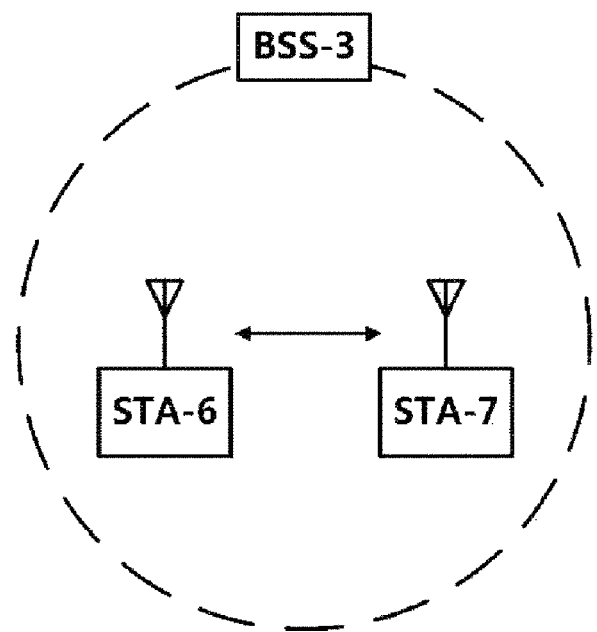
FIG. 2 illustrates independent BSS, which is a wireless LAN system in accordance with another example embodiment.

FIG. 2 illustrates an independent BSS, which is a wireless LAN system in accordance with another example embodiment. The overlapping descriptions of the parts in the example embodiment of FIG. 2, which are identical or correspond to those of FIG. 1, will be omitted.

Since BSS-3 illustrated in FIG. 2 is an independent BSS and includes no AP, all stations (STA-6, STA-7) are in the state of not being connected to an AP. The independent BSS is not allowed to be connected to the DS, and establishes a self-contained network. In the independent BSS, the stations (STA-6, STA-7) may be directly connected to each other.

Figure 3:
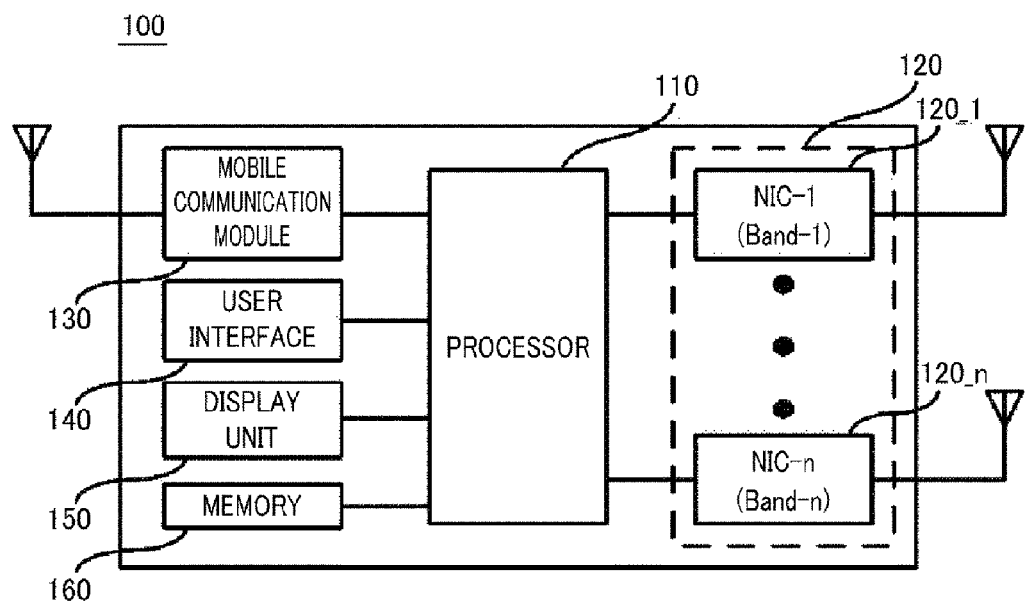
FIG. 3 is a block diagram showing configuration of a station in accordance with an example embodiment.

FIG. 3 is a block diagram showing configuration of a station in accordance with an example embodiment.

As illustrated, STA 100 in accordance with an example embodiment may include a processor 110, at least one network interface card (NIC) 120, a mobile communication module 130, a user interface unit 140, a display unit 150 and a memory 160.

First, the network interface card 120 is a module for implementing wireless LAN connection and may be provided in the inside of STA 100 or outside STA 100. In accordance with an example embodiment, the network interface card 120 may include a multiple number of network interface card modules 120_1 to 120_n using different frequency bands. For example, the network interface card modules 120_1 to 120_n may include network interface card modules of different frequency bands of 2.4 GHz, 5 GHz, 60 GHz and others. In accordance with an example embodiment, STA 100 may be provided with at least one network interface card module using a frequency band of 6 GHz or more, and at least one network interface card module using a frequency band of 60 GHz or less. Each of the network interface card modules 120_1 to 120_n may implement radio communication with an AP or an outside STA according to a wireless LAN specification of the frequency band supported by the corresponding network interface card module 120_1 to 120_n. The network interface card 120 may operate only one network interface card module 120_1 to 120_n at once or the multiple number of the network interface card modules 120_1 to 120_n at the same time depending on performance and demand of STA 100.

Meanwhile, the block diagram of FIG. 3 illustrates that the multiple number of the network interface card modules 120_1 to 120_n of STA 100 are separated from one another, and the MAC/PHY layer of each of the network interface card modules 120_1 to 120_n is independently operated. However, the present disclosure is not limited thereto, and the multiple number of the network interface card modules of different frequency bands may be provided in the state of one integrated chip in STA 100.

Next, the mobile communication module 130 transmits and receives a radio signal with at least one of a base station, an outside device, and a server by using a mobile communication network. Here, the radio signal may include data in various forms such as a voice call signal, a video calling call signal, or a character/multimedia message.

Next, the user interface unit 140 includes various input/output means provided in STA 100. That is, the user interface unit 140 may receive user's input by using the various input means, and the processor 110 may control STA 100 based on the received user input. In addition, the user interface unit 140 may implement output based on instructions by the processor 110 by using the various output means.

Next, the display unit 150 outputs an image on a display screen. The display unit 150 may output various display objects such as contents executed by the processor 110 or user interface based on control instructions by the processor 110. In addition, the memory 160 stores a control program used in STA 100 and its relevant various data. This control program may include a connection program necessary to enable STA 100 to implement connection to an AP or an outside STA.

The processor 110 of example embodiments may execute various instructions or programs, and implement processing of data in STA 100. Also, the processor 110 may control the above-described units of STA 100, and data transmission and reception among the units. In accordance with an example embodiment, the processor 110 controls communication operation of STA 100 such as sector sweep signal transmission/reception and feedback signal transmission/reception in response thereto.

In addition, the processor 110 executes a program for executing connection to an AP as stored in the memory 160, to receive a communication setup message transmitted by the AP, read out information about a priority requirement for STA 100 included in the communication setup message, and request connection to the AP according to the information about the priority requirement for STA 100. Specific descriptions in this regard are described later.

FIG. 3 illustrates a block diagram of STA 100 in accordance with an example embodiment, and the separately indicated blocks are intended to logically discriminate the elements of the device. Accordingly, the above-described elements of the device may be mounted as one chip or a multiple number of chips depending on design of the device. In addition, in an example embodiment, some of the components of STA 100, e.g., the mobile communication module 130, the user interface unit 140 and the display unit 150 may be selectively provided in STA 100.

Figure 4:
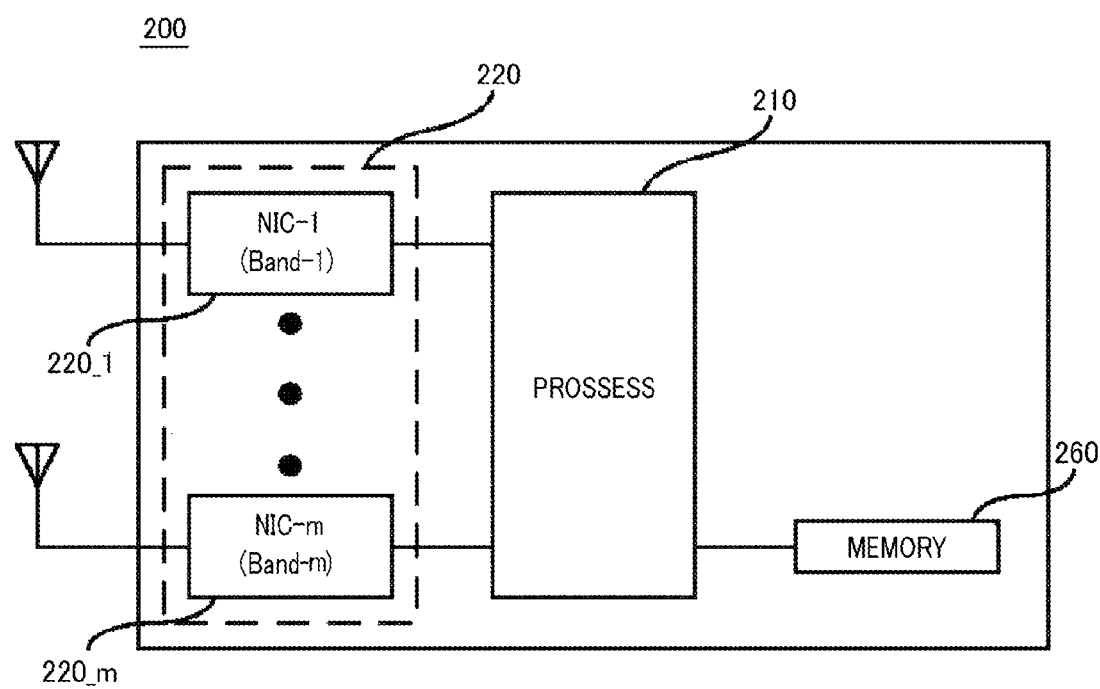
FIG. 4 is a block diagram showing configuration of an AP in accordance with an example embodiment.

FIG. 4 is a block diagram showing configuration of an AP in accordance with an example embodiment.

As illustrated, AP 200 in accordance with an example embodiment may include a processor 210, a network interface card (NIC) 220, and a memory 160. The overlapping descriptions of the components of AP 200 in FIG. 4, which are identical or correspond to those of STA 100 of FIG. 3, will be omitted.

With reference to FIG. 4, AP 200 in accordance with an example embodiment is provided with a network interface card 220 to operate the BSS in at least one frequency band. As described above with regard to the example embodiment of FIG. 3, the network interface card 220 of AP 200 also may include a multiple number of network interface card modules 220_1 to 220_m using different frequency bands. That is, AP 200 in accordance with an example embodiment may be provided with network interface card modules of different frequency bands, e.g., two (2) or more of 2.4 GHz, 5 GHz, and 60 GHz. Preferably, AP 200 may be provided with at least one network interface card module using a frequency band of 6 GHz or more, and at least one network interface card module using a frequency band of 60 GHz or less. Each of the network interface card modules 220_1 to 220_m may implement radio communication with an STA according to a wireless LAN specification of a frequency band supported by the corresponding network interface card module 220_1 to 220_m. The network interface card 220 may operate only one network interface card module 220_1 to 220_m at once or the multiple number of the network interface card modules 220_1 to 220_m at the same time according to performance and demand of AP 200.

Next, the memory 260 stores a control program used in AP 200 and its relevant various data. This control programs may include a connection program for managing connection of an STA. In addition, the processor 210 may control each of the units of AP 200, and data transmission and reception among the units.

In addition, the processor 210 executes a program for executing connection to a station as stored in the memory 260, to transmit a communication setup message to one or more STAs 100, and implement connection setup according to connection requests by STAs 100, and the communication setup message includes information about a connection priority requirement for each of the stations. Specific descriptions in this regard are described later.

Figure 5:
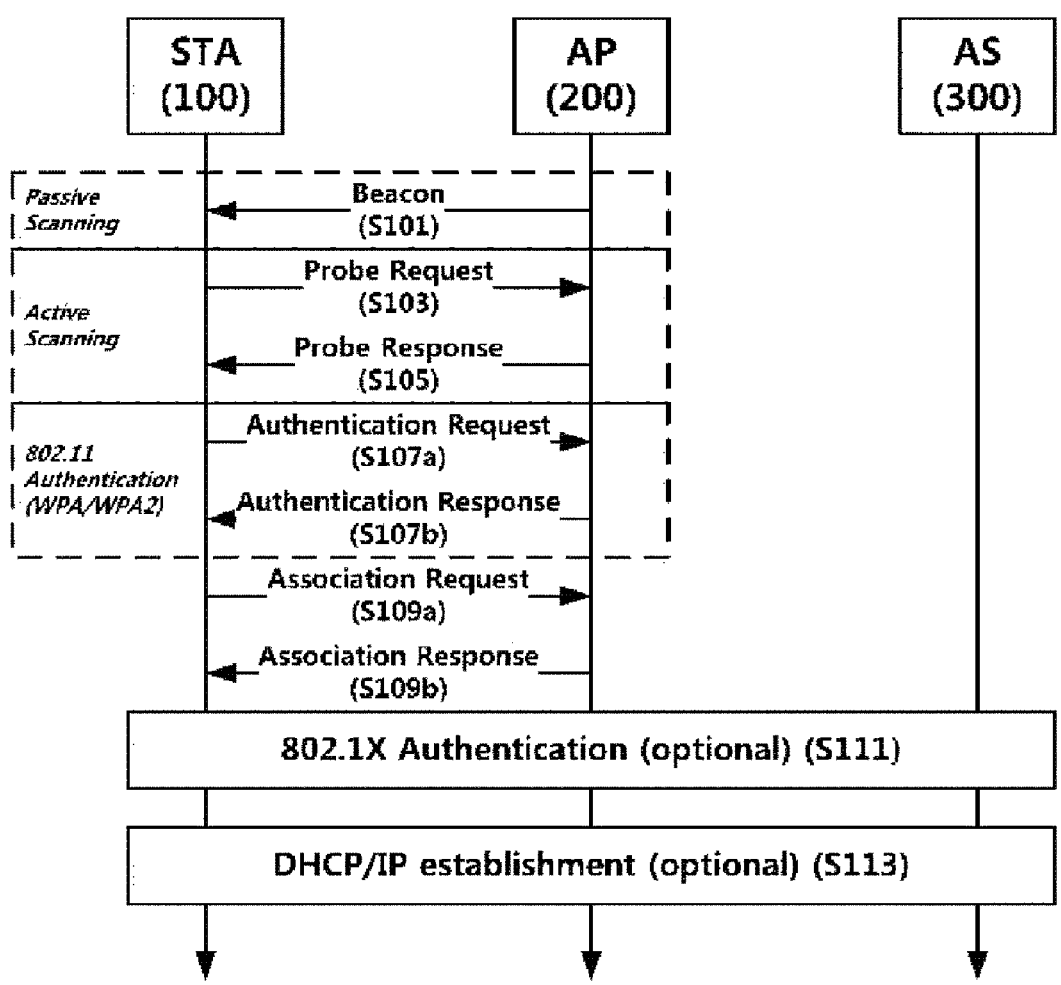
FIG. 5 schematically illustrates a step, in which an STA associated with an example embodiment sets link with an AP.

FIG. 5 schematically illustrates a step, in which an STA associated with an example embodiment sets link to an AP.

With reference to FIG. 5, the step, in which STA 100 in accordance with an example embodiment is connected to AP 200, is divided largely into the following three (3) steps: scanning, authentication, and association. The scanning step enables STA 100 to acquire connection information for the BBS operated by AP 200. As a method for implementing the scanning, there are a passive scanning technique, which acquires the information only by using a beacon message periodically transmitted by an AP (S101), and an active scanning technique, which acquires the connection information in the manner that the STA transmits a probe request to the AP and receives a probe response from the AP (S105).

STA 100 that has successfully received the radio connection information in the scanning step implements the authentication procedure by transmitting an authentication request (S107a), and receiving an authentication response (S107b).

After the successful implementation of the authentication procedure in the IEEE 802.11 layer, the association step (S109a, S109b) is implemented, and authentication based on 802.1X (S111) and acquisition of an IP address through DHCP (S113) may be further implemented.

Figure 6:
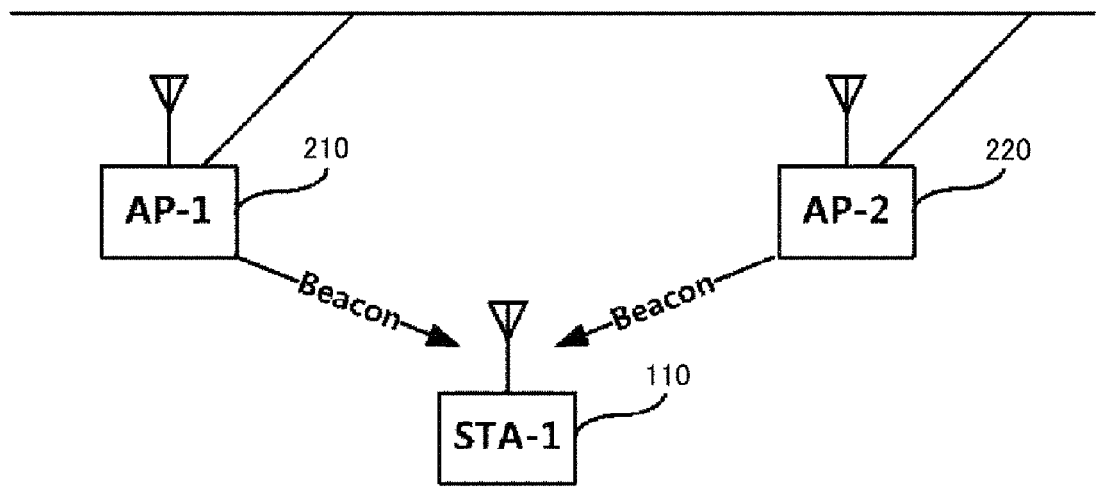
FIG. 6 illustrates a passive scanning way of an STA associated with an example embodiment.

FIG. 6 illustrates the passive scanning way of the STA associated with an example embodiment.

With reference to FIG. 6, first STA 110 in accordance with an example embodiment receives a beacon message periodically transmitted by peripheral first AP 210 and second AP 220 to acquire radio connection information of each of the APs.

Figure 7:
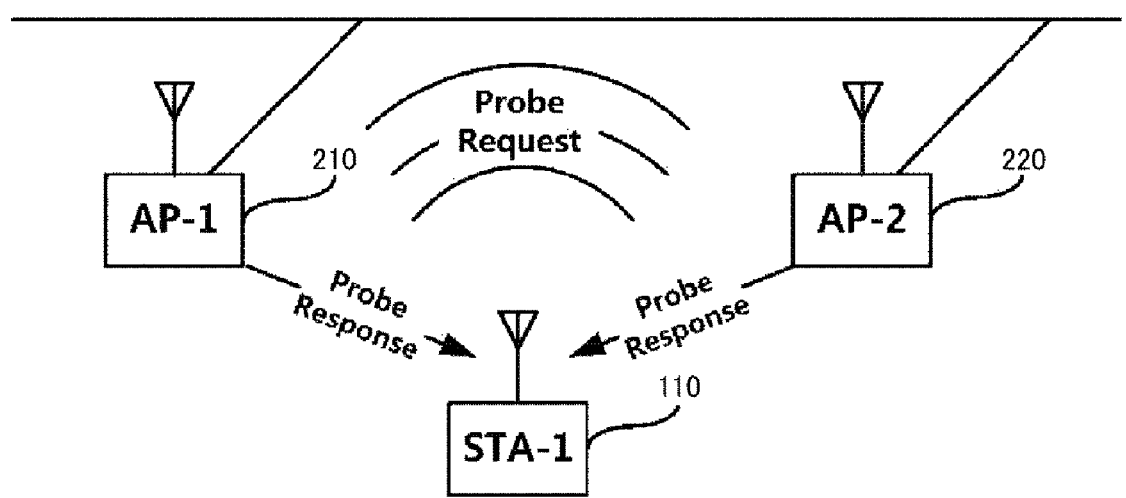
FIG. 7 illustrates an active scanning way of an STA associated with an example embodiment.

FIG. 7 illustrates the active scanning way of the STA associated with an example embodiment.

With reference to FIG. 7, first STA 110 in accordance with an example embodiment transmits a probe request message to acquire information of peripheral APs, and receives a probe response message in response thereto from each of first AP 210 and second AP 220 to acquire radio connection information of each of the APs.

Figure 8:
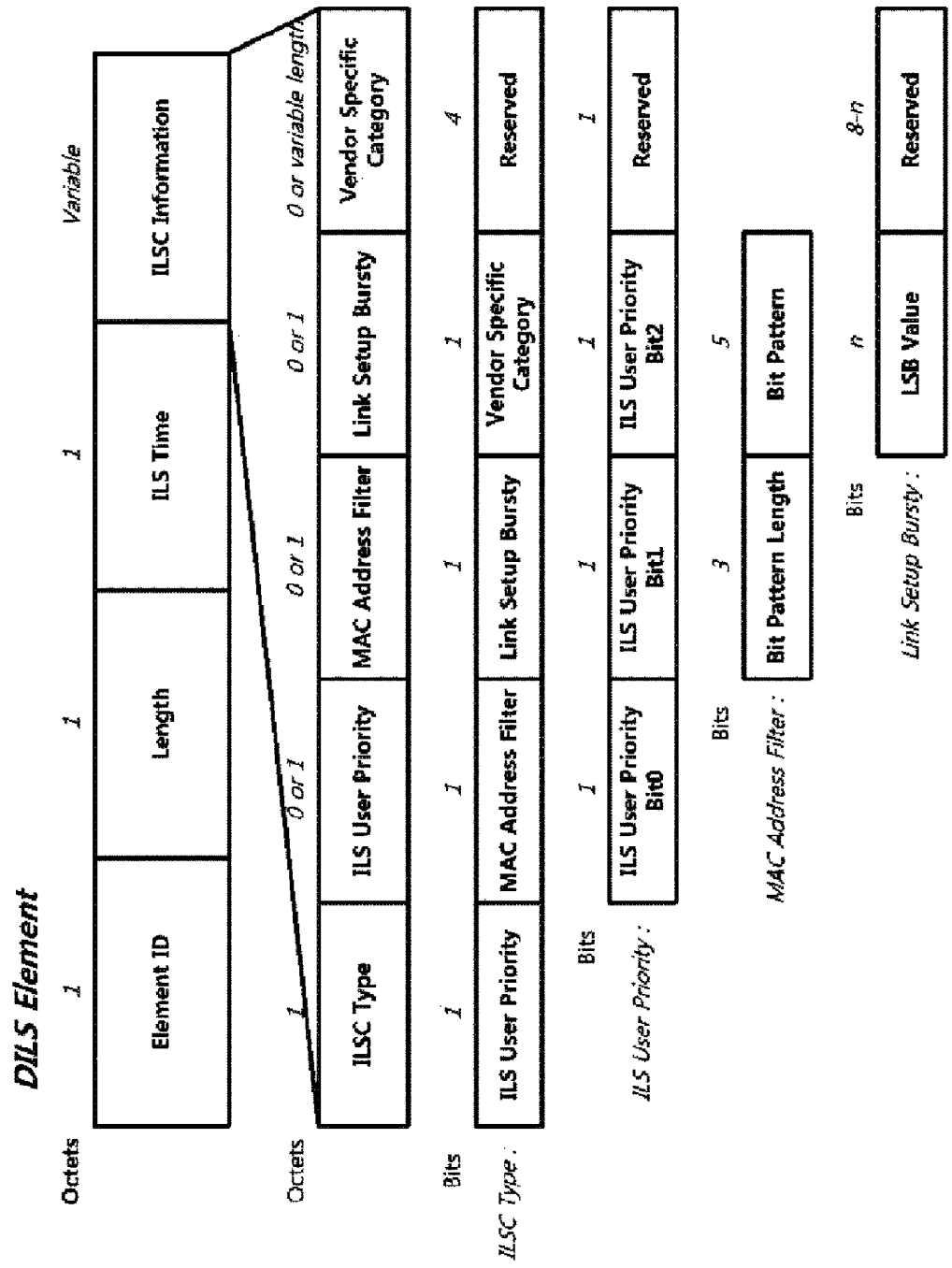
FIG. 8 shows information about connection priority requirements corresponding to an example embodiment.

FIG. 8 shows information about connection priority requirements corresponding to an example embodiment.

Connection priority requirement information is intended to distribute connection timing by STAs to an AP and may be defined by differentiated initial link setup (DILS) information. In example embodiments, the DILS information has an effect in distributing connection timing by a multiple number of STAs when the STAs are connected to an AP.

The DILS information may include identifier information (Element ID), message length information, connection time information (ILS Time), and initial link setup category (ILSC) information.

The identifier information indicates a sole identifier of the DILS information, the message length information means a size of a whole message, and the connection time information indicates connection time permitted for an STA. The initial link setup category information includes information about requirements for STAs allowable for connection. An STA, which meets the requirements specified in the initial link setup category information, may attempt connection for the time specified in the connection time information, and an STA, which does not meet the requirements, may attempt connection after the connection time information is terminated.

Of the connection priority requirements, the initial link setup category information may include user priority information (LS User Priority), hardware identifier information of a station (MAC address filter), and vendor-specific connection allowance information (Vendor Specific Category). In addition, the initial link setup category information may further include link setup information (Link Setup Bursty), which indicates the combined state of the information or information about priority of the information.

At least one of the requirements may be set, and whether each of the requirements has been set may be identified from whether its corresponding bit map in ILSC type information (ILSC Type) has been set to 1.

If the user priority information of the ILSC type information has been set to 1, the user priority information in the DILS information may exist in a size of 1 byte. For example, the user priority information in the DILS information may be indicated by a first bit (FILS User Priority Bit 0), a second bit (FILS User Priority Bit 1) and a third bit (FILS User Priority Bit 2) within 1 byte. In this case, an AP sets certain bits of the first to third bits to 1 according to priority of an STA allowable for connection. If an STA attempting connection receives the DILS information, in which transmission priority of a frame stored in a transmission buffer of the STA and a user priority bit matching with the transmission priority are set to 1, the STA is allowable for connection For example, in the user priority information, priority may be interpreted to be the highest in the case where the first bit has been set to 1, followed by the case where the second bit has been set to 1, and the case where the third bit has been set to 1. In this case, if the first bit of the user priority information included in the DILS information has been set to 1, an STA attempting to transmit frames of high 4~7 transmission priorities of total 0~7 frame transmission priorities meets the user priority requirement. If the second bit of the user priority information included in the DILS information has been set to 1, an STA attempting to transmit frames of low 0~3 priorities meets the user priority requirement. If the third bit of the user priority information included in the DILS information has been set to 1, an STA having no frames to be transmitted meets the user priority requirement. As described above, since an STA, which meets the requirement matching with the user priority information included in the DILS information, attempts connection according to the priority, distribution of STA's connection can be induced.

If the station hardware identifier information (MAC Address Filter) of the ILSC type information has been set to 1, the station hardware identifier information (MAC Address Filter) within the DILS information may exist in a size of 1 byte. Such station hardware identifier information includes MAC address requirements for STAs allowable for connection to an AP.

If the vendor-specific connection allowance information (Vendor Specific Category) of the ILSC type information has been set to 1, the vendor-specific connection allowance information (Vendor Specific Category) within the DILS information may exist in a size of 1 byte or a certain byte. The vendor-specific connection allowance information (Vendor Specific Category) includes requirements for STAs allowable for connection, which are separately defined by STA vendors.

If the link setup information (Link Setup Bursty) of the ILSC type information has been set to 1, the link setup information within the DILS information may exist in a size of 1 byte.

In accordance with an example embodiment, for example, the link setup information of the ILSC type information may indicate the combined state of the user priority information, the station hardware identifier information, and the vendor-specific connection allowance information, or the requirements corresponding to priority of the information.

For example, if the link setup information has been set to 0, only STAs, which meet all the user priority information, the station hardware identifier information, and the vendor-specific connection allowance information, may attempt connection for allowable connection time (ILS Time).

In accordance with another example embodiment, the link setup information may indicate the combined state of the requirements in more detail. For example, through each bit of 1 octet link setup information, it may be possible to indicate application of a combination, which necessarily meets the user priority information and additionally meets the station hardware identifier information or the vendor-specific connection allowance information.

In accordance with another example embodiment, priority of the vendor-specific connection allowance information may be set to be the highest, followed by priority of the user priority information, and priority of the station hardware identifier information. Since the requirement corresponding to the vendor-specific connection allowance information grants priority to a certain station according to demand of a vendor who has provided a corresponding AP, the vendor-specific connection allowance information is set to have the highest importance. Since the requirement corresponding to the user priority information dynamically determines priority depending on importance of traffic of data that a current station attempts to transmit, the user priority information is set to have medium importance. In case of the station hardware identifier information, since distribution of a MAC address of each station is random, the station hardware identifier information is set to have the lowest importance for control of approach by an unspecific station.

To be more specific, first, it is assumed that DILS information of a communication setup message transmitted by an AP includes all the vendor-specific connection allowance information, the user priority information, and the station hardware identifier information. If a station receiving the message first meets the requirement for the vendor specific connection allowance information, it attempts connection to the AP without considering whether it meets the other requirements. If the station does not meet the requirement for the vendor-specific connection allowance information, it attempts connection when it meets the requirements for the user priority information and the station hardware identifier information. Exceptionally, however, if the user priority is a certain level or higher, the station may attempt connection to the AP, irrespective of whether it meets the requirement for the station hardware identifier information.

Second, it is assumed that DILS information of a communication setup message transmitted by an AP includes the user priority information and the station hardware identifier information. If a station receiving the message meets the requirements for both the user priority information and the station hardware identifier information, it attempts connection. Exceptionally, however, if the user priority is a certain level or higher, the station may attempt connection to the AP, irrespective of whether it meets the requirement for the station hardware identifier information.

Third, it is assumed that DILS information of a communication setup message transmitted by an AP includes only the vendor-specific connection allowance information and the user priority information, or only the vendor-specific connection allowance information and the station hardware identifier information. If a station receiving the message first meets the requirement for the vendor-specific connection allowance information, it attempts connection to the AP without considering whether it meets the other requirements. If the station does not meet the requirement for the vendor-specific connection allowance information, it attempts connection when it meets the requirement for the user priority information or the station hardware identifier information.

Fourth, it is assumed that DILS information of a communication setup message transmitted by an AP includes only one of the vendor-specific connection allowance information, the user priority information and the station hardware identifier information. If a station receiving the message meets the requirement for the information included in the DIULS information, it attempts connection to the AP.

As described above, the combine state and the priority of the requirements included in the DILS information may be variously set, and this information may be discriminated through the link setup information.

Figure 9:
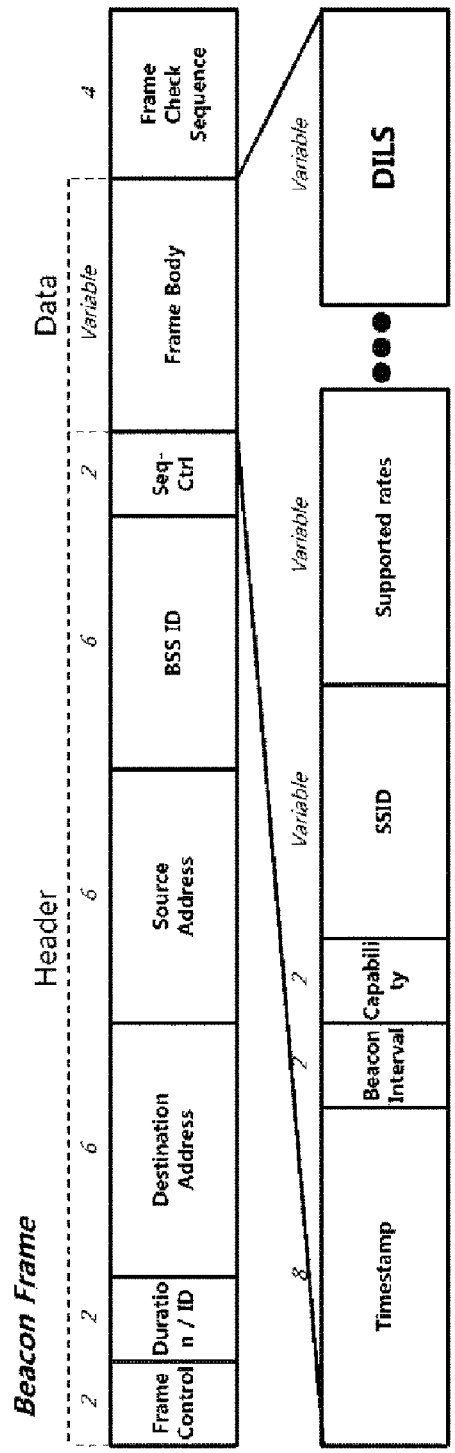
FIG. 9 shows a structure of a beacon message that an AP periodically transmits to STAs in accordance with an example embodiment.

FIG. 9 shows a structure of a beacon message that an AP periodically transmits to STAs in accordance with an example embodiment.

If an AP provides differentiated link setups to STAs, connection priority requirement information is inserted into a data field of the beacon message. STAs attempting connection to a corresponding AP may analyze the connection priority requirement included in the DILS information, especially, the initial link setup category information, to attempt the connection within available connection time after receiving the beacon if they meet the corresponding requirement, or attempt the connection after the available connection time if they do not meet the corresponding requirement.

Figure 10:
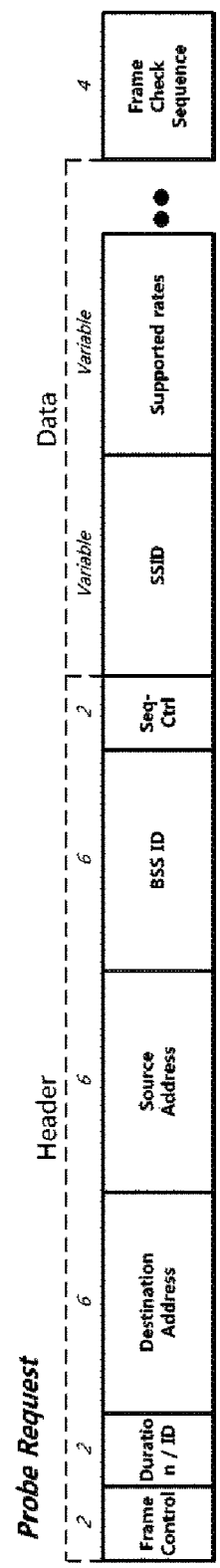
FIG. 10 shows a structure of a probe request message, in which STAs request connection to an AP in order to be connected to the AP.
Figure 11:
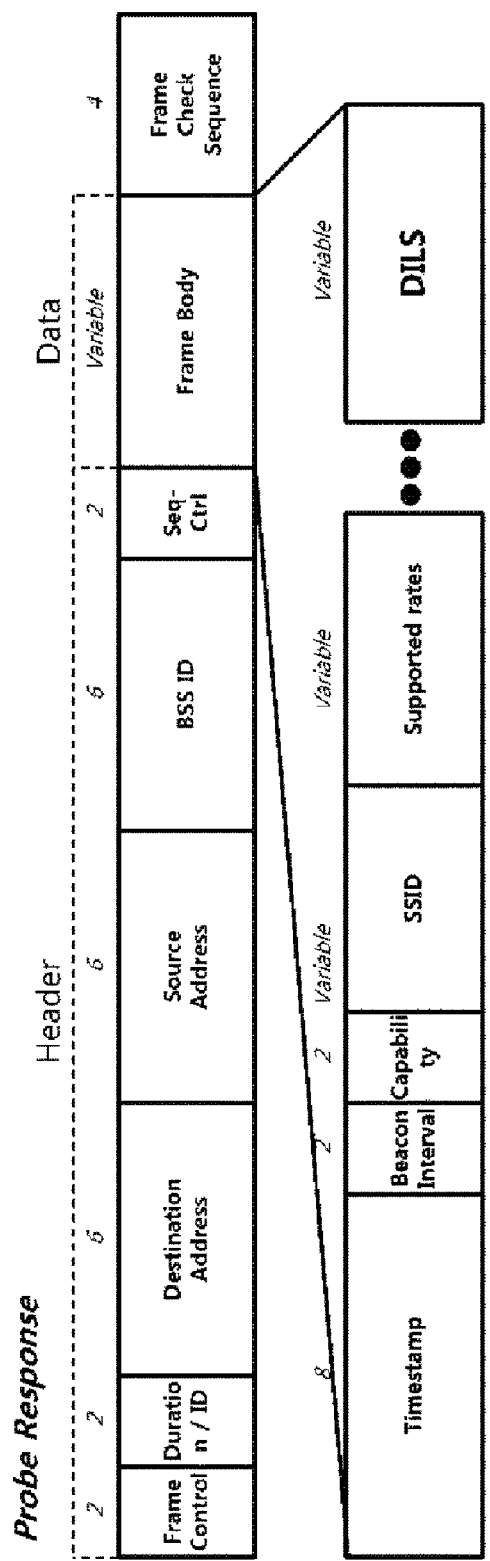
FIG. 11 shows a structure of a probe response message transmitted by an AP having received a probe request message in accordance with an example embodiment.

FIG. 10 shows a structure of a probe request message, in which STAs request connection to an AP in order to be connected to an AP, and FIG. 11 shows a structure of a probe response message transmitted by an AP having received the probe request message in accordance with an example embodiment.

If an AP provides differentiated link setups to STAs, connection priority requirement information is inserted into a data field of the probe response message. The STAs attempting connection to a corresponding AP may analyze the connection priority requirement included in the DILS information, especially, the initial link setup category information, to attempt the connection within available connection time after receiving the beacon if they meet the corresponding requirement, or attempt the connection after the available connection time if they do not meet the requirement.

As described above, the communication setup message like the beacon message in the passive scanning manner or the probe response message in the active scanning manner includes information about a connection priority requirement for each station, and on this basis, each station implements connection setup.

Figure 12:
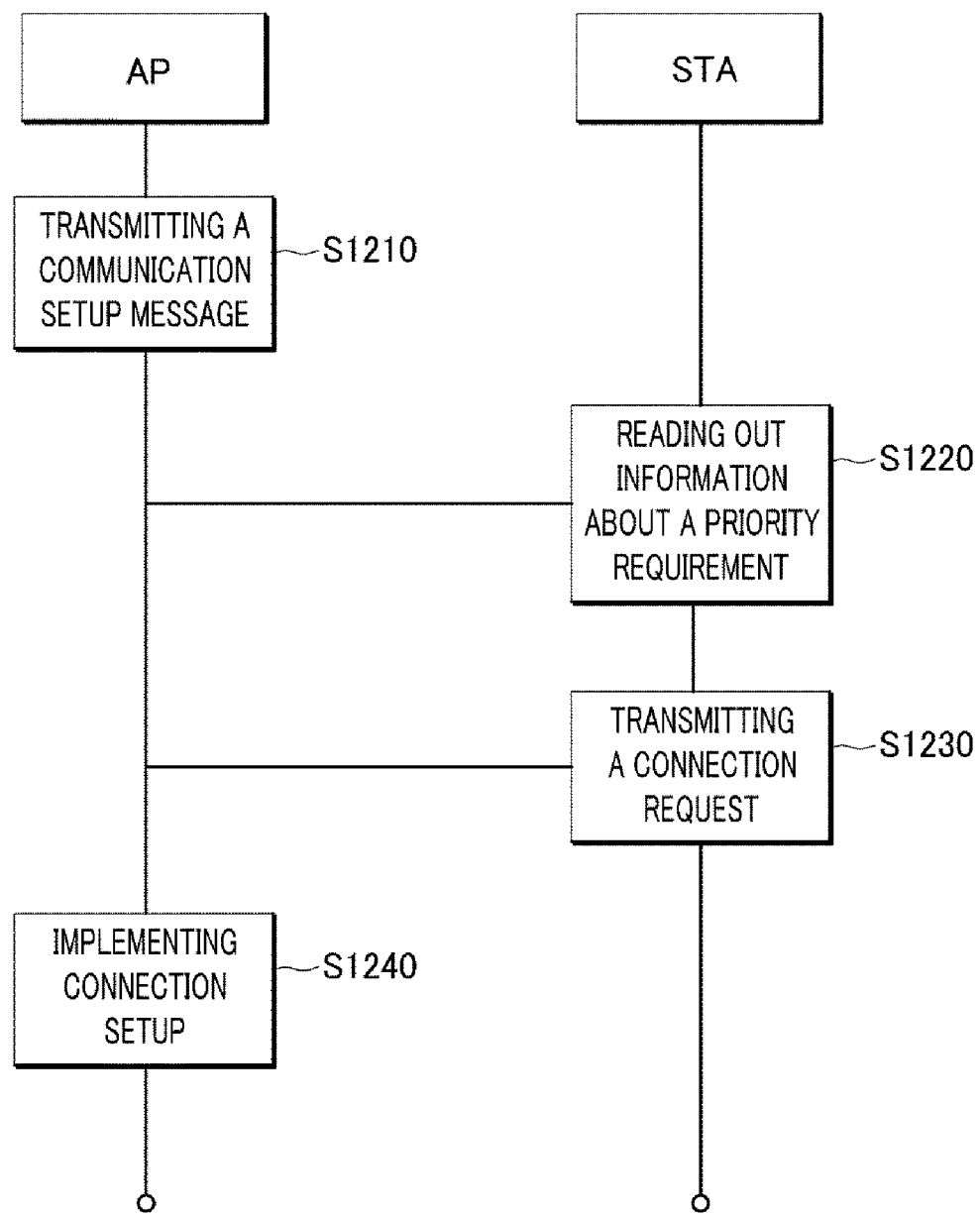
FIG. 12 is a flow chart illustrating procedures for connection between an STA and an AP in accordance with an example embodiment.

FIG. 12 is a flow chart illustrating procedures for connection between an STA and an AP in accordance with an example embodiment.

First, an AP transmits a communication setup message to an STA (S1210). For example, in case of the passive scanning way, the beacon message is the communication setup message. In case of the active scanning way, the probe response message is the communication setup message. In addition, as described above, the communication setup message includes the DILS information, i.e., information about a connection priority requirement for an STA.

Next, the STA reads out the information about the connection priority requirement included in the communication setup message (S1220). In this case, the information about the connection priority requirement includes information of time, for which a station meeting the connection priority requirement can attempt connection. Further, the information about the connection priority requirement may include information indicating user priority, information indicating a hardware identifier of a station allowable for connection, and information indicating a requirement for a station allowable for connection, which is defined by vendors. In addition, the information about the connection priority requirement may include information indicating the combined state or priority of the above-described information.

Next, the STA transmits a connection request to the AP based on the read-out information (S1230). Since STAs meeting the connection priority requirement included in the communication setup message are different from one another, they transmit their connection requests at different time points.

Next, the AP implements connection setup with the STA that has implemented the connection request (S1240).

Figure 13:
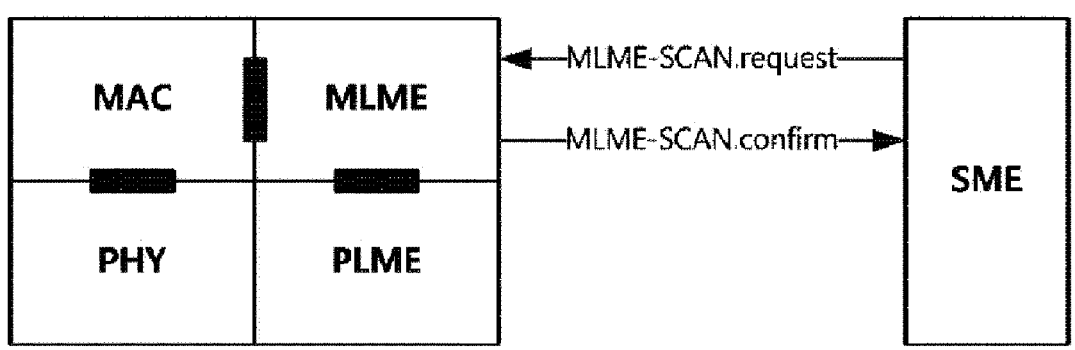
FIG. 13 shows an internal layer structure of an STA in accordance with an example embodiment.

FIG. 13 shows an internal layer structure of an STA in accordance with an example embodiment.

Layers defined in the IEEE 802.11 standard largely include a medium access control (MAC) layer and a physical (PHY) layer. There are a mac layer management entity (MLME) and a physical layer management entity (PLME) to manage each of the layers, and the entities receive instructions from a station management entity (SME) managing STAs.

The step, in which an STA searches an AP based on the internal layer structure of the STA, is described hereinafter. SME transmits a MLME scan request primitive (MLME-SCAN.request primitive) to MLME. The MLME scan request primitive includes conditions or information for channel search. MLME having received the primitive implements the passive or active scanning described in FIG. 6 and FIG. 7 according to the conditions specified in the primitive.

Meanwhile, a reporting option may be defined such that when receiving the beacon message or the probe response message from a certain AP, the STA processes information through the PHY and MAC layers, and when finding out BSS information, the STA reports the information to SME.

In this case, the reporting option is divided into immediate reporting (IMMEDIATE), channel specific reporting (CHANNEL_SPECIFIC), and at-end reporting (AT END).

First, if the reporting option is the immediate reporting, BSS information is transmitted to SME through the MLME scan confirmation primitive (MLME-SCAN.confirm primitive) immediately when the information is found out.

Second, if the reporting option is the channel reporting, one or more BSS information found out in a certain channel is transmitted to SME through the MLME scan confirmation primitive (MLME-SCAN.confirm primitive) at once after lapse of maximum channel time (MaxChannelTime) from the point of time that the scanning starts.

Third, if the reporting option is the at-end reporting, all BSS information found out in one or more channels are transmitted to SME through the MLME scan confirmation primitive (MLME-SCAN.confirm primitive) at once at the point of time that the scanning for all the channels is finished.

For example, thirteen (13) channels may exist in 2.4 GHz wireless LAN, and a certain AP operates in a certain channel. Since an STA has no knowledge of in which channels APs are present, it sequentially or randomly implements scanning by channels. In this case, if the reporting option is the immediate reporting, found-out AP information is immediately and internally reported to the STA. If the reporting option is the reporting by channels, information of all APs found out in one channel is reported at once at the point of time that the corresponding channel is terminated. In addition, if the reporting option is the at-end reporting, information of all APs found out in all channels is reported only once at the final time point.

In accordance with an example embodiment, even if the reporting option of the MLME scan request primitive is the immediate reporting (Reporting Option=IMMEDIATE), and MLME implements passive or active scanning through the corresponding primitive, it is possible to deliver, to SME, BSS information extracted from the beacon message or the probe response message, which includes DILS information having the LSB bit set to 1. Instead, the BSS information may be delivered to SME after being delayed until the point of time that scanning of a corresponding channel or all channels is finished. This is intended to determine that other STAs' requests for connection to the AP having transmitted the corresponding communication setup message are relatively high, and delay the requests for connection to the corresponding AP.

However, if the reporting option is the immediate reporting, BSS information extracted from the beacon message or the probe response message, which includes no DILS information or DILS information having the LSB bit set to zero (0), is immediately delivered to SME according to the immediate reporting. In this way, SME may preferentially process the information about the AP having no DILS information. In addition, if other STAs' requests for connection to the AP having transmitted the corresponding communication setup message are determined to be relatively low, the transmission is implemented according to the initially set reporting option.

Figure 14:
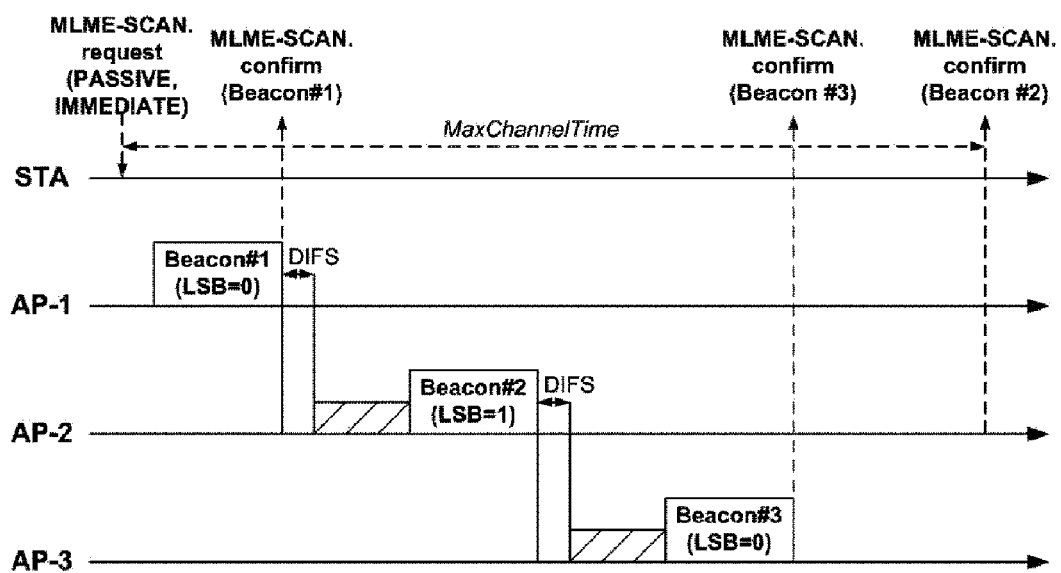
FIG. 14 illustrates passive scanning procedures in accordance with an example embodiment.

FIG. 14 illustrates passive scanning procedures in accordance with an example embodiment. SME delivers instructions to MLME by setting the scan type in the MLME scan request primitive to passive (Scan Type=PASSIVE), and the reporting option to the immediate reporting (Reporting Option=IMMEDIATE). When a certain channel receives transmission of the beacon message for minimum channel time (MinChannelTime) from the point of time that the instructions are delivered, the STA collects the beacon messages for maximum channel time (MaxChannelTime).

According to FIG. 14, the STA receives the beacon message from each of AP-1, A-2, and A-3, and in this case, it is assumed that the LSB bit in the DILS information of the beacon message received from each of AP-1 and AP-3 is set to zero (0), and the LSB bit of the beacon message received from AP-2 is set to 1. This indicates the state that AP-2 is currently receiving connection requests (Authentication Request or Association Request) from many STAs. In this case, in case of the beacon messages received from AP-1 and AP-3, the STA immediately delivers the BSS information received in the beacon messages through the MLME scan confirmation primitive according to the immediate reporting option, which is the reporting option requested upon the MLME scan request. However, in case of the beacon message received from AP-2, the STA does not follow the immediate reporting option and delivers the BSS information received in the beacon message to SME after delaying the deliver until the point of time that scanning of a corresponding channel or all channels is finished. FIG. 14 illustrates an example for delivering the BSS information, which is included in the beacon message received from AP-2 and has the LSB bit set to 1, to SME after delaying the deliver until the point of time that scanning of a corresponding channel is finished. This is intended to determine that other STAs' requests for connection to the AP having transmitted the corresponding communication setup message are relatively high, and delay the requests for connection to the corresponding AP.

In accordance with another example embodiment, there are methods capable of delaying and delivering the beacon message having the LSB bit set to 1 to SME or deferring the deliver, compared to other beacon messages having the LSB bit set to zero (0) or including no DILS information. This determination may be determined by relative difference between the number of the beacon messages having the LSB bit set to zero (0) or including no DILS information, and the number of the beacon messages having the LSB bit set to 1.

Figure 15:
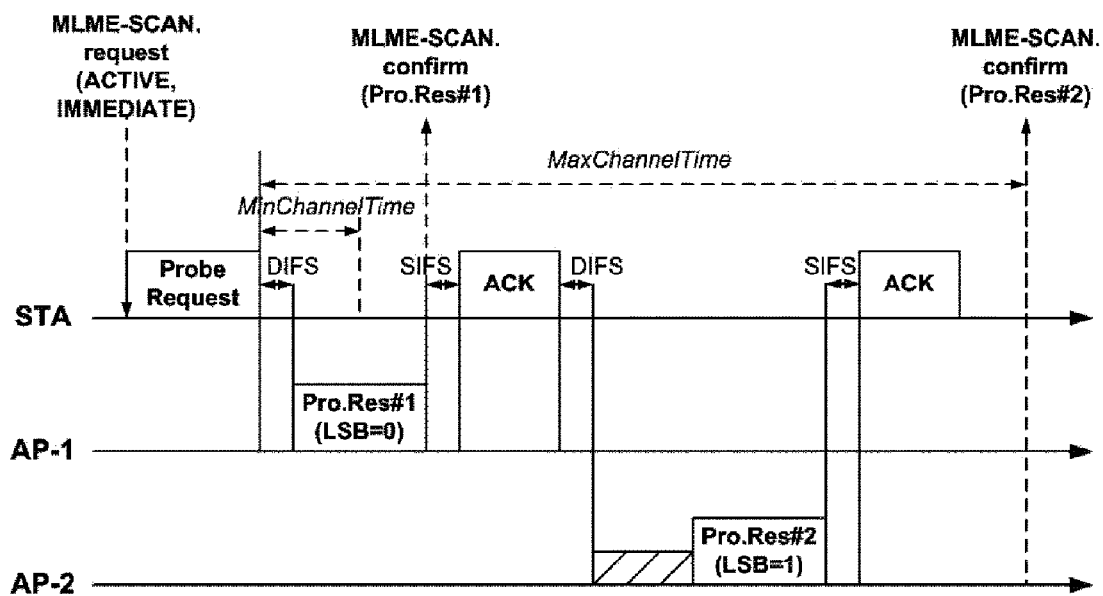
FIG. 15 illustrates active scanning procedures in accordance with an example embodiment.

FIG. 15 illustrates active scanning procedures in accordance with an example embodiment.

SME within the STA delivers instructions to MLME by setting the scan type in the MLME scan request primitive to active (Scan type=ACTIVE), and the reporting option to immediate reporting (Reporting Option=IMMEDIATE). When a certain channel receives transmission of a probe response message for minimum channel time (MinChannelTime) from the point of time that the probe request messages is transmitted, the STA collects the probe response messages during maximum channel time (MaxChannelTime).

According to FIG. 15, the STA receives the probe response message from each of AP-1 and AP-2, and in this case, it is assumed that the LSB bit of the DILS information in the probe response message received from AP-1 is set to zero (0), and the LSB bit of the probe response message received from AP-2 is set to 1. This indicates the state that AP-2 is currently receiving connection requests (Authentication Request or Association Request) from many STAs. Here, in case of the probe response message received from AP-1, the STA immediately delivers the BSS information received in the probe response message to SME through the MLME scan confirmation primitive according to the immediate reporting option, which is the reporting option requested upon the MLME scan request. However, in case of the probe response message received from AP-2, the STA does not follow the immediate reporting option and delivers the BSS information received in the probe response message to SME after delaying the deliver until the point of time that scanning of a corresponding channel or all the channels is finished. FIG. 15 illustrates an example for delivering the BSS information, which is included in the probe response message received from AP-2 and having the LSB bit set to 1, to SME after delaying the deliver until the point of time that scanning of the corresponding channel is finished. This is intended to determine that other STAs' requests for connection to the AP having transmitted the corresponding communication setup message are relatively high, and delay the requests for connection to the corresponding AP.

In accordance with another example embodiment, there are methods capable of delaying and delivering the probe response message having the LSB bit set to 1 to SME or deferring the deliver, compared to other probe response messages having the LSB bit set to zero (0) or including no DILS information. This determination may be determined by relative difference between the number of the probe response messages having the LSB bit set to zero (0) or including no DILS information, and the number of the probe response messages having the LSB bit set to 1.

In accordance with another example embodiment, the instructions are delivered by setting the scan type in the MLME scan request primitive to active or passive, and the reporting option to reporting by channels. In this case, the communication setup message having the LSB bit set to 1 is delayed and delivered to SME, compared to other communication setup messages having the LSB bit set to zero (0) or including no DILS information. In this case, the relevant information is set to be transmitted according to the at-end reporting option, which further delays the reporting timing, compared to the reporting by channels. However, in case of the communication setup message including no DILS information or having the LSB bit set to zero (0), the relevant information is transmitted according to the previously set reporting option by channels.

Figure 16:
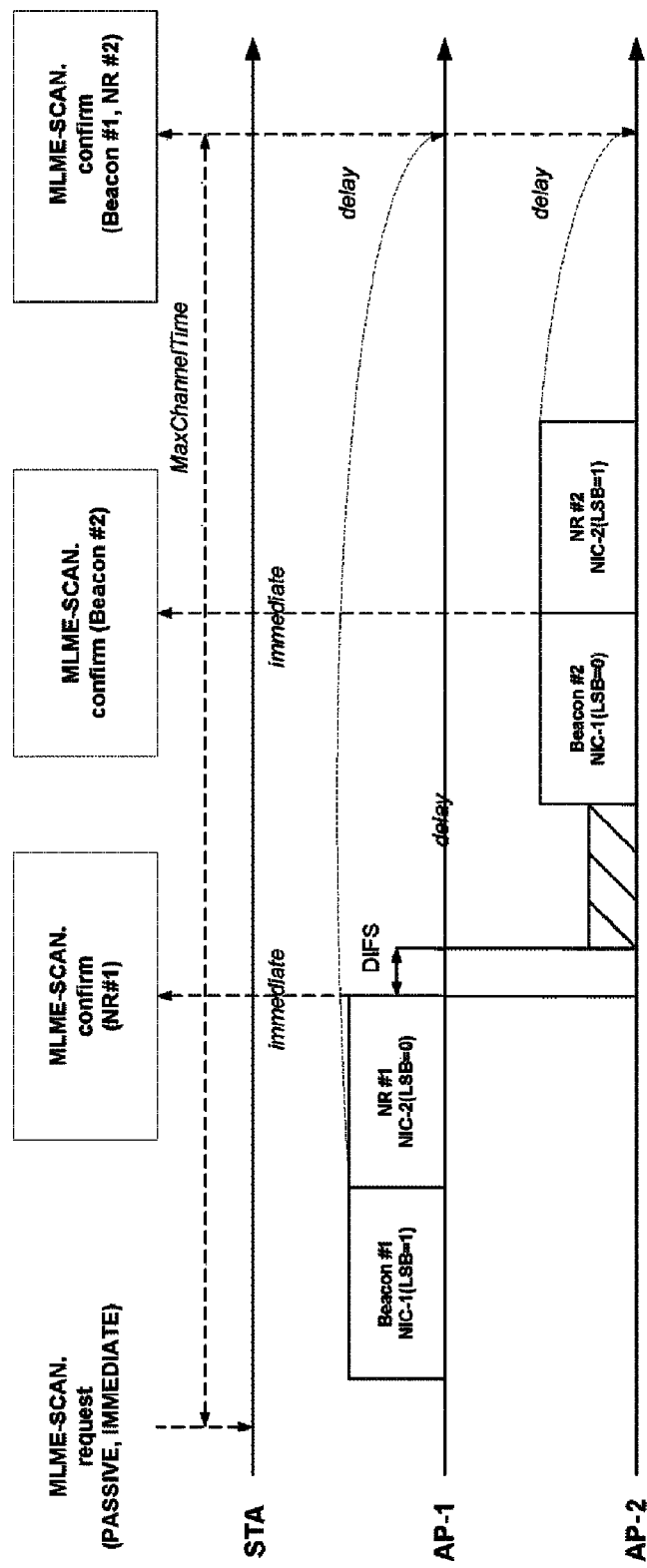
FIG. 16 shows procedures for scanning between an AP and an STA, each which includes a multiple number of network interface card modules, in accordance with an example embodiment.
Figure 17:
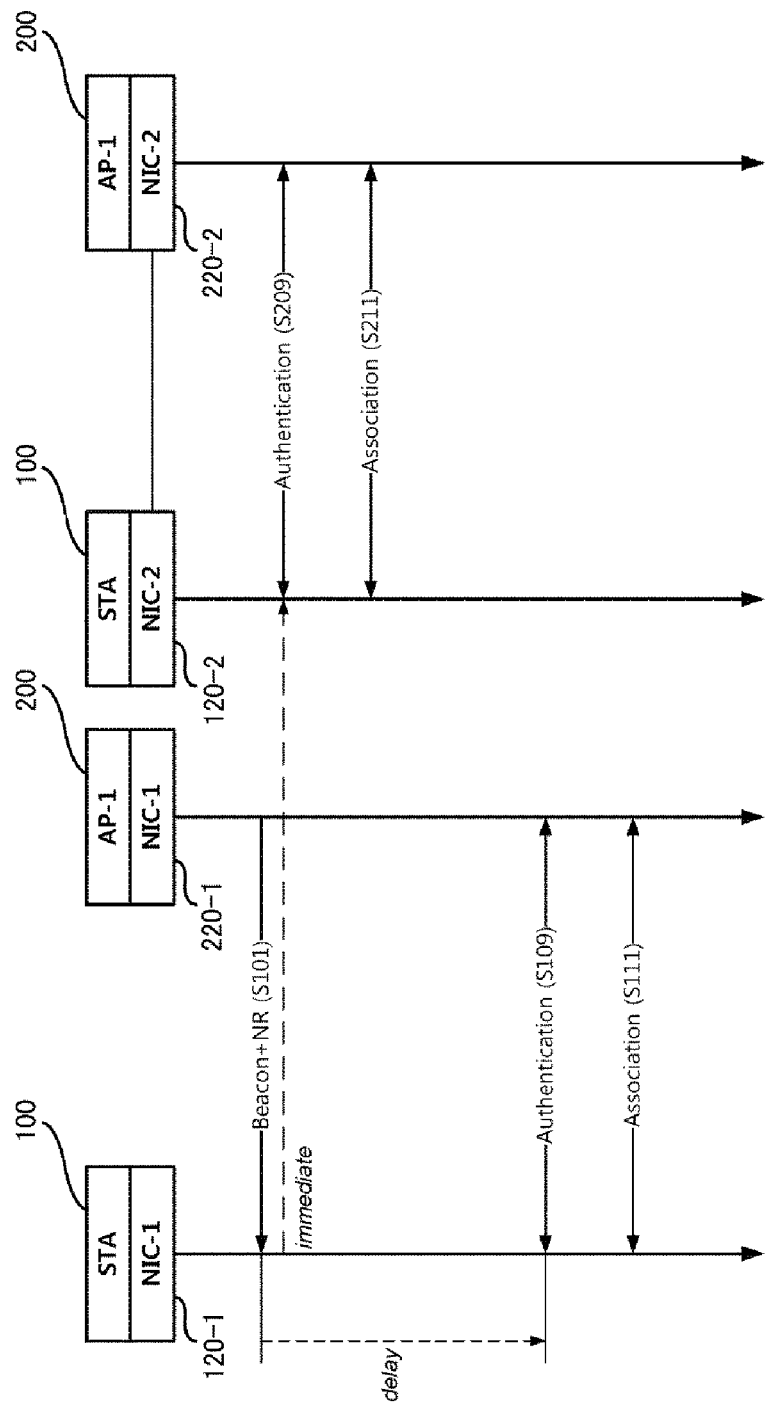
FIG. 17 shows procedures for connection between an AP and an STA in accordance with an example embodiment.

FIG. 16 shows procedures for scanning between an AP, which includes a multiple number of network interface card modules, and an STA in accordance with an example embodiment, and FIG. 17 shows procedures for connection between an AP and an STA in accordance with an example embodiment.

The illustrated example embodiments show that an AP is provided with a multiple number of network interface card modules, whereby an STA implements connection in consideration of connection priority requirements by the network interface card modules.

SME within the STA delivers instructions to MLME by setting the scan type in the MLME scan request primitive to passive (Scan Type=PASSIVE), and the reporting option to immediate reporting (Reporting Option=IMMEDIATE). When a certain channel receives transmission of the beacon message by using the network interface card modules for minimum channel time (MinChannelTime) from the point of time that the instructions are delivered, the STA collects the beacon messages for maximum channel time (MaxChannelTime).

The STA receives the beacon message from each of AP-1 and AP-2, and in this case, it is assumed that each of AP-1 and AP-2 has two (2) network interface card modules. The communication setup message transmitted by AP-1 includes a first beacon message (Beacon #1) including information about BSS operated in first network interface card module 220_1 of AP-1 and first neighbor report (NR #1) including information about BSS operated in a second network interface card module 220_2 of AP-1. That is, the first beacon message and the first neighbor report are transmitted in a combined form.

In this case, it is assumed that the LSB bit within the DILS information of the first beacon message is set to 1, and the LSB bit within the DILS information of the first neighbor report message is set to zero (0). This indicates the state that the first network interface card module 220_1 of AP-1 is currently receiving connection requests (Authentication Request or Association Request) from many STAs, and the second network interface card module 220_2 of AP-1 offers normal connection.

The communication setup message transmitted by AP-2 includes a second beacon message (Beacon #2) including information about BSS operated in the first network interface card module of AP-1 and a second neighbor report (NR#2) including information about BSS operated in the second network interface card module of AP-2.

In this case, it is assumed that the LSB bit within the DILS information of the second beacon message is set to zero (0), and the LSB bit within the DILS information of the second neighbor report message is set to 1. This indicates the state that the first network interface card module of AP-2 offers normal connection, and the second network interface card module of AP-2 is currently receiving connection requests (Authentication Request or Association Request) from many STAs.

Here, in case of the first neighbor report message and the second beacon message received from AP-1 and AP-2, the STA immediately delivers the BSS information received from AP-1 and AP-2 to SME through the MLME scan confirmation primitive according to the immediate reporting option, which is the reporting option requested upon the MLME scan request. However, in case of the first beacon message and the second neighbor report, the STA does not follow the immediate reporting option, and delivers the BSS information after delaying the deliver until the point of time that scanning of a corresponding channel or all channels is finished. FIG. 16 illustrates an example for delivering the BSS information included in the message having the LSB bit set to 1 to SME after delaying the deliver until the point of time that scanning of a corresponding channel is finished. This is intended to determine that other STAs' requests for connection to the AP having transmitted the corresponding communication setup message are relatively high, and delay the requests for connection to the corresponding AP.

In accordance with another example embodiment, there are methods capable of delaying and delivering a beacon (or neighbor report) message having the LSB bit set to 1 to SME or deferring the delay, compared to other beacon (or neighbor report) messages having the LSB bit set to zero (0) or including no DILS information. This determination may be determined by relative difference between the number of the beacon messages having the LSB bit set to zero (0) or including no DILS information, and the number of the beacon messages having the LSB bit set to 1.

FIG. 17 shows procedures for connection between an STA and an AP in accordance with an example embodiment.

As illustrated, STA 100 has a multiple number of network interface card modules 111, 112, and AP-1 has a multiple number of network interface card modules 211, 212. More specifically, FIG. 17 illustrates the case where STA 100 are connected to the multiple network interface card modules 211, 212 of AP-1 200 by using both the multiple network interface card modules 111, 112.

When reviewing the case where STA 100 attempts wireless LAN connection, first, AP-1 200 periodically transmits a beacon message to STAs existing within service areas of all BSSs operated by AP-1200 through a broadcast method (S101). In the present example embodiment, it is assumed that AP-1 200 transmits the beacon message through the first network interface card module 220_1 (S101).

In the present example embodiment, when STA 100 receives a communication setup message through the first network interface card module 120_1, the corresponding message may include a beacon message and a neighbor report message. The beacon message includes information of BSS operated by AP-1 200 through the first network interface card module 220_1. The neighbor report message includes information of BSS of the second network interface card module 220_2 operated by AP-1 200.

STA 100 having received the communication setup message may delay reporting of the BSS information included in each of the messages, based on the value for the LSB bit of the DILS information included in the beacon message and the neighbor report. Since the value for the LSB bit in the beacon message transmitted by the first network interface card module 220_1 of AP-1 200 is set to 1, the reporting is delayed, and thereafter, the connection steps (S109, S111) are proceeded with.

Since the value for the LSB bit in the neighbor report transmitted by the second network interface card module 220_2 of AP-1 200 is set to 0, the BSS information is immediately reported to SME, and thereafter, the connection steps (S209, S211) are proceeded with.

As described above, the AP may transmit information about the connection priority requirements by the multiple number of the network interface card modules, and on this basis, the STA implements a connection request for each of the network interface card modules.

Example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A method to set a connection between an access point and a station, comprising:

transmitting, by the access point, a communication setup message to the station; and implementing, by the access point, a connection setup according to a connection request by the station, wherein the communication setup message comprises a first user priority bit, a second user priority bit, and a third user priority bit, and wherein the first user priority bit indicates high priority link setup for a station comprising transmission queues having frames with user priority 4-7, the second user priority bit indicates low priority link setup for a station comprising a transmission queue having frames with user priority 0-3, and the third user priority bit indicates high priority link setup for a station comprising a transmission que having no frames.

2. The method of claim 1, wherein the communication setup message is a beacon message or a probe response message.

3. The method of claim 1, wherein the communication setup message further comprises information specifying a time duration for a validity of a connection priority condition in the communication setup message.

4. The method of claim 1, wherein the communication setup message further comprises any one or any combination of any two or more of information indicating a hardware identifier of a station allowable for connection, or information indicating a requirement for a station allowable for connection, which is defined by vendors.

5. A method to set a connection between an access point and a station, comprising:

receiving, by the station, a communication setup message transmitted by the access point;

reading information of a priority requirement for a station included in the communication setup message; and transmitting a connection request to each of network interface card modules of the access point according to the information of the priority requirement for the station, wherein the communication setup message comprises a first user priority bit, a second user priority bit, and a third user priority bit, and wherein the first user priority bit indicates high priority link setup for a station comprising transmission queues having frames with user priority 4-7, the second user priority bit indicates low priority link setup for a station comprising a transmission queue having frames with user priority 0-3, and the third user priority bit indicates high priority link setup for a station comprising a transmission que having no frames.

6. The method of claim 5, wherein the communication setup message is a beacon message or a probe response message.

7. The method of claim 5, wherein the communication setup message further comprises information specifying a time duration for a validity of a connection priority condition in the communication setup message.

8. The method of claim 5, wherein the communication setup message further comprises any one or any combination of any two or more of information indicating a hardware identifier of a station allowable for connection or information indicating a requirement for a station allowable for connection, which is defined by vendors.

* * * * *